Dec. 22, 1970   L. W. HOLLINGSWORTH   3,549,215
HYDROSTATICALLY SUPPORTED TILTING PAD JOURNAL BEARING
Filed Oct. 21, 1968
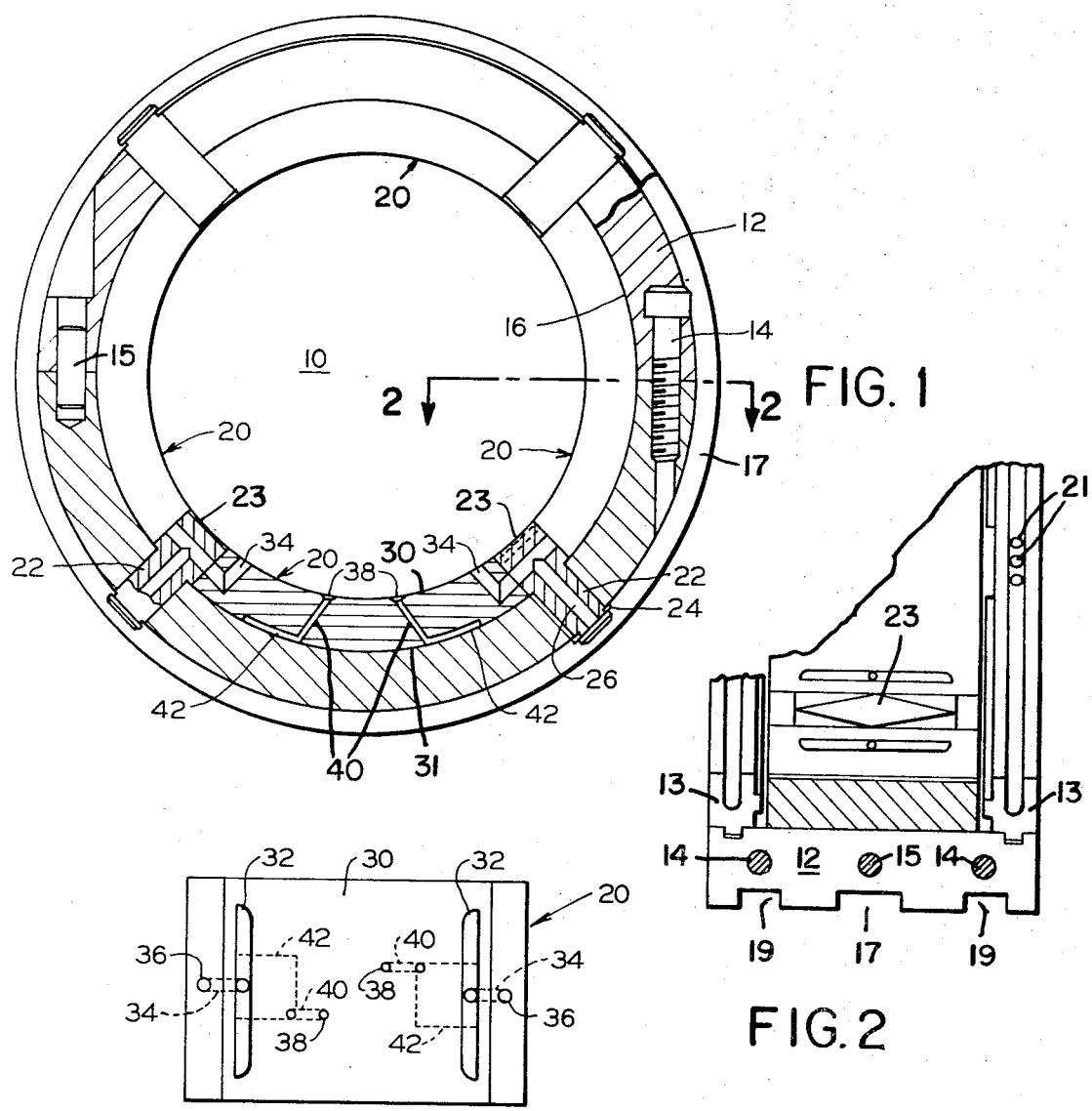
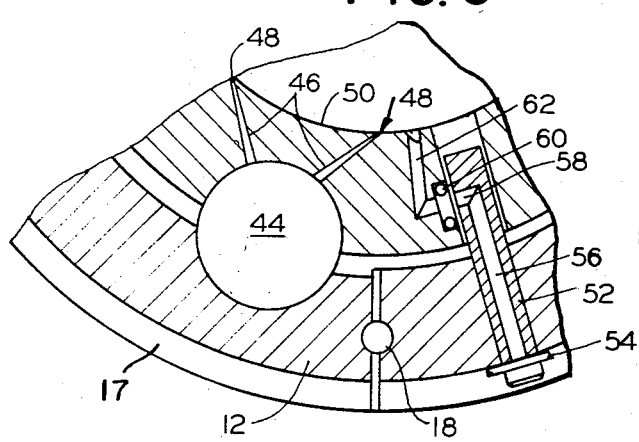
INVENTOR.
LEON W. HOLLINGSWORTH
BY
Townsend and Townsend
ATTORNEYS United States Patent Office 3,549,215
Patented Dec. 22, 1970

3,549,215
HYDROSTATICALLY SUPPORTED TILTING PAD JOURNAL BEARING
Leon W. Hollingsworth, Olympia, Wash., assignor to Pioneer Motor Bearing Company, South San Francisco, Calif.
Filed Oct. 21, 1968, Ser. No. 769,241
Int. Cl. F16c 17/06
U.S. Cl. 308—73                    13 Claims

ABSTRACT OF THE DISCLOSURE

This is a tilting pad journal bearing in which the pads are hydrostatically supported by a hydrodynamically generated oil film. The tilting pads which surround a rotating shaft are held in a carrier ring. Each pad has internal oil supply conduits communicating with an oil supply groove in the outer circumference of the carrier ring. The hydrostatic support is furnished by the hydrodynamic pressure generated in the wedge-shaped oil film between the pad and the shaft and supplied to a recess or recesses on the outer face of the pad. The recess or recesses accumulate pressurized oil from the film to support the pad.

---

This invention relates to tilting pad journal bearings and, more particularly, to a tilting pad journal bearing in which the hydrostatic support for the pads is furnished by the hydrodynamic oil film.

Tilting pad journal bearings are well-known. These bearings were an outgrowth of the tilting pad style thrust bearings developed by Kingsbury and others. One of the primary advantages of the tilting pad journal bearing is its resistance to a phenomenon known as oil whirl or oil whip. This phenomenon, the effects of which are well known, but the specific causes of which have not yet been fully explained, is believed to be caused by action of the oil film upon the shaft rotating in the bearing. Whatever the specific cause of whip in a journal bearing, the results are that a machine cannot be operated at certain speeds or loads with conventional sleeve-type journal bearings. Certain journal bearing designs will increase the stability of a shaft and prevent or reduce the possibility of whip. Among the most stable types of journal bearings in order of their ability to eliminate whip are the nutcracker, tilting pad, elliptical offset and many others.

While a number of these bearing designs will eliminate or substantially reduce the occurrence of oil whip, the use of such bearings results in high power losses and aeration of the lubricating oil in the bearing. Conventional tilting pad journal bearings yield a high degree of journal stability at the expense of a relatively high power loss in the bearing.

Conventional tilting pad journal bearings are lubricated by means of an oil bath which is picked up by the rotating journal in order to form the well-known wedge-shaped hydrodynamic oil film between the surface of the journal and the bearing face. Also known in the prior art is a tilting pad journal bearing wherein a hydrodynamic pressure generated at a loaded pad in turn hydrostatically loads an opposing pad to suppress whirl. Disadvantages associated with such designs include relatively high cost, space occupied, and chance for leakage leading to possible failure.

The tilting pad journal bearings of the present invention were designed to eliminate the dependence of the journal bearing upon an external source of high pressure oil and, in addition, to eliminate the requirement for large quantities of lubricating oil which flood the conventional tilting pad journal bearing. The bearings of the present invention take advantage of the hydrodynamic pressure built up in the wedge-shaped oil film during rotation of the journal to provide a hydrostatic support for the tilting pads of the bearing.

The hydrostatic support for the pads serves a dual function. First, it acts as a pivot to permit the pad to tilt in response to rotation of the journal and the formation of the wedge-shaped hydrodynamic film; and second, it permits movement of the pad to accommodate flexure or misalignment of the journal. In any tilting pad journal bearing the peak hydrodynamic pressure is reached at a point approximately 58% of the circumferential distance from the leading edge of each pad. A conventional tilting pad journal bearing designed for birotation must locate the pivot point centrally (50% from leading edge). It cannot, therefore, achieve optimum load carrying capacity. The present invention, in utilizing the pressurized fluid support pivot, allows the pads to achieve maximum load carrying capacity in either direction of rotation through the inherent characteristics of a hydrostatic fluid support. Still another advantage of the present design is the double-damping effect upon vibration of the double oil film; that is, the wedge-shaped hydrodynamic film between the pad and journal and the hydrostatic oil support between the pad and the bearing housing tend to damp shaft vibration.

It has been found experimentally that pressurized oil may be led from the wedge-shaped film to either a single support cavity behind the tilting pad or to a plurality of support cavities, depending upon the characteristics desired from the bearing. Still another experimental design has utilized the hydrodynamic oil film to form a hydrostatic support upon a ball-mounted tilting pad thus substantially reducing the frictional forces on the pad and permitting the pad to better accommodate changes in shaft speed, loading, lubricant viscosity and misalignment. Still another advantageous factor in the use of the journal bearings of the present design is their relatively low cost. Thus, the substantial problem of oil whip is largely overcome by the present invention at a lower cost in terms of lower initial investment, lower horsepower loss, lower oil consumption, less physical space required.

IN THE DRAWINGS

FIG. 1 is an end view, partly in section, of a hydrostatically supported tilting pad journal bearing of the present design showing in detail the configuration of one of the pads;

FIG. 2 is a cross-section of the bearing taken along line 2—2 in FIG. 1;

FIG. 3 is a plan view of one of the tilting pads; and

FIG. 4 is a fragmentary view in partial section of a ball-mounted tilting pad utilizing pressure from the hydrodynamic oil film to support the pad.

Referring now more particularly to the drawing in which the same reference numerals refer to corresponding parts in each of the several views, a rotating shaft which is to be supported by the bearing of the present design is shown at 10. A carrier ring 12 which carries the tilting pads is usually installed within a machine housing (not separately shown). The carrier ring 12 may be a solid steel ring or, as is shown in FIG. 1, a split ring. If it is a split ring it is usually held together by means of bolts 14 and aligned by dowel pins 15. The carrier ring 12 may have a machined channel 16 to hold the pads 20 or the channel 16 may be formed by the internal circumferential surface of the carrier ring 12 and two oil retainers 13, one at each end, to hold pads 20 axially. Machined into the outside circumferential surface of the carrier ring 12 are three oil grooves. One central groove 17 supplies oil at low pressure to the bearing surface of the pads. The other two grooves 19 are drainage or scavenging grooves.

The lubricating oil which fills the oil groove 17 is led to the interface between the shaft 10 and the pads 20 through a plurality of pad stops 22 held in place in the carrier ring by means of retainer rings 24. A drilled conduit 26 leads the oil from the groove 17 to the intersection drilled passage 28, whence it flows through openings 36 into internal conduits 34 and into elongated grooves 32. A pair of elongated grooves 32 aligned with the axis of the shaft 10 are connected to the conduit 34 so that oil is spread over the entire bearing face 30 of the pad as the shaft rotates. The axially aligned grooves 32 are symmetrically disposed in the face 30 of the bearing pad adjacent to the edges of the face of the pad. Thus, lubricating oil is uniformly available to the entire surface of the pad whether the rotation is clockwise or counter-clockwise.

The tilting pads 20 have arcuate faces 30 and 31. The inner face 30 is substantially the diameter of the shaft 10, while arcuate outer face 31 is substantially the diameter of the internal circumferential surface 16 of the carrier ring 12. There is, however, sufficient clearance between the inner face 30 and the shaft 10 and the outer face 31 and the surface of the channel 16 to permit the pads 20 to tilt under the influence of the wedge-shaped film which forms upon rotation of the shaft 10. On the outer face 31 of each pad 20 is a shallow recess or recesses 42 which are in fluid communication with the inner face 30 of the pad by means of entrance holes 38 on the face 30 and internal holes 40 which pass through from the entrance holes 38 to the recesses 42.

An alternate ball-type of support for a tilting pad is shown in FIG. 4. Lubricating oil from the oil groove 17 is fed through the drilled conduit 56 in stop pad 52. The stop pad is held in place in the carrier ring 12 by means of retainer ring 54. Drilled conduit 56 leads to the intersection with drilled passage 58 which is aligned with and communicates with drilled passage 62 in the ball supported pad 50. The ball supported pad 50 is provided with a spherical recess which fits over a large diameter ball 44 which fits into a spherical recess in the carrier ring 12. Passage 58, which is in fluid communication with the passage 62, is sealed to minimize loss of lubricating oil by means of O-ring 60 which presses against the surface of the stop 52 and around the outlet of passage 58. In this bearing axially aligned dowels 18 may be utilized, in addition to bolts (not shown) for holding the split carrier ring 12 together and in radial alignment. Tilting pad 50 has an internal passage or passages 46 which terminate at orifice or orifices 48 on the inner surface of the pad 50. The passage or passages 46 communicate with the spherical recess within which the ball 44 is received.

The operation of the bearing of the present design may be understood by reference to FIG. 1. The oil channel 17 enclosed in the machine housing is filled with oil under pressure, and this oil is led through the stop pads 22 and into the tilting pad grooves 32. When the shaft 10 begins to rotate, oil is picked up from these grooves forming the well-known wedge-shaped oil film between the shaft surface and the faces of the tilting pads. Since there is some clearance between the shaft and the inner bearing faces of the pads and between the outer faces and the carrier 16, the pads will tend to tilt under the action of the wedge-shaped film. When the film forms, the lubricant which makes up the wedge-shaped film becomes pressurized through the action of the shaft on the oil. This oil under high pressure is led through orifices 38 and conduits 40 into the recess or recesses 42 under the tilting pads. The recess or recesses fill with pressurized oil and form a hydrostatic pressure zone between the pad 20 and the face of the carrier 16. Thus, the tilting pad is floating between the shaft 10 and the carrier ring 12 on two high pressure oil films. Since there is a pressure gradient in the oil wedge, the pressure being greatest at a point 58% in from the leading edge of the pad in the plane of rotation of the bearing pad 20, the recess closest to the trailing edge is under the greatest pressure, an equilibrium being reached through the flow of oil from around the outer face 31 of the pad. The effect of the oil pressure under the pad is similar to that on a pure hydrostatic oil pad. That is, the pad freely floats between two oil films so that the frictional losses in the bearing are at a minimum.

The ball mounted pad shown in FIG. 4 functions in a similar manner to the pad illustrated in FIG. 1. The wedge-shaped film is formed and led through orifice or orifices 48 and internal conduit or conduits 46 into the spherical recess within which ball 44 is received. This effects a hydrostatic action upon the ball, lifting the pad completely from the ball so that there is no metal to metal contact between the pad and the ball.

In each of the embodiments shown, there is also provided passages 21 in the carrier ring for removing the lubricating oil which is wiped and escapes from the faces of the pads and leading this excess to the scavenging grooves 19. The passages 21 are connected between the groove 19 and the oil retainers 13, the retainers acting to collect the escaping lubricant for leading it to the scavenging grooves.

In either of the embodiments described, the direction of rotation of the shaft will have no effect upon the functioning of a hydrostatic support. The orifices located on the inner face of the pad are symmetrically disposed with respect to the edges of the pad so that pressurized oil from the wedge will be forced either into recesses 42 or into the spherical recess for the ball 44, whether the shaft carried by the bearing is rotating clockwise or counter-clockwise.

Scavenging of the lubricating oil is accomplished by the combination of the oil retainers 13, passages 21 and scavenging grooves 19 as well as the heads 23 of the pad stops 22. The pad stops are assembled into the carrier ring so that they float, that is, there is a small amount of radial movement possible. Thus, when the shaft is rotating, the heads 23 of the pad stops lightly contact the shaft. The heads 23 have, in the preferred embodiment a diamond shape (shown in FIG. 2) which lightly contacts the rotating shaft and serves to wipe any excess oil off the shaft and into the oil retainers 13 from whence the oil is led through passages 21 into the scavenging grooves 19.

The pad stops 22 serve, as has been noted, to supply lubricating oil to the bearing pads 20. Since they are located adjacent the bearing pads circumferentially in the carrier ring they also serve to prevent circumferential shifting of the pads. Further, since the stops are inserted radially between the pads, they also have keystone effect, holding the pads captive against radial movement as well.

An experimental bearing utilizing this arrangement reduced the parasitic losses due to oil churning or turbulence to as low as one half that of a conventional flooded bearing. The present design is thus a substantially more efficient bearing because of the direct lubrication of individual pads and the efficient scavenging system.

I claim:
1. A tilting pad journal bearing for supporting a rotatable shaft comprising a carrier ring for receiving a plurality of bearing pads, and a bearing pad, said pad having an arcuate inner face for contacting the shaft and support means on the outer face for supporting the pad by the carrier ring, said pad having at least one oil supply bore therein for conveying lubricating oil to the inner face thereof, said pad having at least one conduit in fluid communication between the inner face and the outer face of the pad, the outer face having a recess therein connected with the conduit for receiving and accumulating oil from the wedge-shaped oil film which forms between the inner face of the pad and the shaft surface when the shaft is rotating so that the pad is supported in the carrier ring on a hydrostatic oil pad produced by the hydrodynamic action of the rotating journal.

2. The bearing of claim 1 and wherein the carrier ring has a groove therein along the outer circumference for acting as a lubricating oil supply conduit, and wherein the carrier has a radial conduit therein communicating between the lubricating oil groove and the oil supply bore in the bearing pad.

3. The bearing of claim 1 and wherein the pad has two oil supply bores circumferentially spaced apart so that oil will be supplied near the leading edge of the pad when the shaft is rotating in either direction, wherein there are two conduits having their inlets circumferentially spaced apart along the inner face of the pad so that the pressure at each inlet will be equivalent when the direction of rotation is changed and wherein there are two circumferentially spaced apart recesses on the outer face for hydrostatically supporting the pad with a hydrodynamically generated oil film upon rotation of the shaft in either direction.

4. The bearing of claim 1 and wherein the carrier has a spherical ball mounted therein, the recess in the outer face of the pad is shaped to receive said spherical ball and the pad is supported on a hydrostatic film of oil in the spherical recess hydrodynamically generated when the shaft is rotating.

5. A tilting pad for a journal bearing including a carrier ring for receiving the pad, said ring having radial conduits and means in fluid communication with the conduits for supplying lubricant to the pad, said pad having an arcuate inner bearing surface and an arcuate outer supporting surface, said outer surface receivable inside the carrier ring and pivotable thereon when a shaft received within the bearing rotates, said outer surface having a recess therein, said pad having an internal conduit between the inner surface and the recess in the outer surface so that lubricant may be forced from between the shaft and the bearing surface and into the recess for supporting the pad when the shaft is rotating.

6. The tilting pad of claim 5 and wherein the recess on the outer surface is at the center of the pad and is shaped to receive a spherical ball mounted on the inner surface of the carrier ring.

7. The tilting pad of claim 5 and wherein the radial conduits are positioned adjacent said pads along the circumference of the carrier ring and are movable radially so that one end thereof may contact the shaft received in the bearing, said end shaped to wipe lubricant from the shaft surface, said journal bearing including means for collecting the lubricant from the shaft surface.

8. The tilting pad of claim 5 and wherein the arcuate outer surface is shaped to permit the pad to rock on the outer surface to adjust to the formation of a wedge-shaped lubricant film between the rotating shaft and the inner bearing surface, and wherein the outer surface of the pad has two recesses, each recess receiving lubricant from the inner bearing surface.

9. The bearing of claim 1 wherein the carrier ring has a circumferential groove therein for removing lubricating oil which escapes from the faces of the pad.

10. The bearing of claim 9 including a retainer for retaining the pad against axial movement, said retainer having a recess therein for accumulating lubricating oil escaping from the faces of the pad, said recess being in fluid communication with the circumferential lubricating oil removing groove.

11. A tilting pad journal bearing comprising: carrier means for supporting a plurality of bearing pads against a rotatable shaft, a bearing pad tiltable on the carrier and having internal lubricating oil supply means and means for receiving lubricating oil under hydrodynamic pressure from between the pad and the shaft, means for conveying lubricating oil from the shaft externally of the carrier means, and means for wiping oil from the shaft and leading it to the conveying means.

12. The bearing of claim 11 wherein the means for conveying the oil comprises a circumferential groove in the carrier means, an oil retainer held in the carrier means for preventing axial movement of the pads, said oil retainer having a recess therein for collecting lubricating oil, said recess in fluid communication with the groove, and wherein the wiping means comprises a pad stop mounted in the carrier means and movable radially so that the stop may contact the shaft surface.

13. The bearing of claim 1 and wherein the bearing pad has an arcuate outer face for contacting the carrier ring.

References Cited
UNITED STATES PATENTS

| | | | |
|---|---|---|---|
| 3,004,804 | 10/1961 | Pinkus | 308—73 |
| 3,044,839 | 7/1962 | Andres | 308—160 |
| 3,398,996 | 8/1968 | Wucherer | 308—73X |

FOREIGN PATENTS

| | | | |
|---|---|---|---|
| 394,010 | 6/1933 | Great Britain | 308—73 |

FRED C. MATTERN, Jr., Primary Examiner

F. SUSKO, Assistant Examiner